United States Patent
Blake et al.

(10) Patent No.: US 6,191,897 B1
(45) Date of Patent: Feb. 20, 2001

(54) BEAM ALIGNMENT CORRECTION ELEMENT ASSEMBLY

(75) Inventors: Laurence S. Blake, Peabody; David B. Larsen, Woburn; Norman Rolfe, Carlisle; Henry A. Kelley, Woburn, all of MA (US); Frank Scholten, Livingston, NJ (US)

(73) Assignee: Agfa Corporation, Wilmington, MA (US)

(*) Notice: Under 35 U.S.C. 154(b), the term of this patent shall be extended for 0 days.

(21) Appl. No.: 09/260,566

(22) Filed: Feb. 2, 1999

Related U.S. Application Data (63) Continuation of application No. 08/687,928, filed on Jul. 29, 1996, now Pat. No. 5,909,323.

(51) Int. Cl.$^7$ .................................................. G02B 7/02
(52) U.S. Cl. ................................................ 359/814; 359/822
(58) Field of Search .............................. 359/814, 813, 359/817, 822, 823, 824

(56) References Cited

U.S. PATENT DOCUMENTS

| | | | |
|---|---|---|---|
| 4,385,373 | 5/1983 | Howe | 369/45 |
| 4,799,799 | 1/1989 | Estes | 350/252 |
| 5,097,351 | 3/1992 | Kramer | 359/17 |
| 5,111,340 | 5/1992 | Kashima et al. | 359/819 |
| 5,170,089 | 12/1992 | Fulton | 310/328 |
| 5,179,463 | 1/1993 | Kramer | 359/204 |
| 5,214,528 | 5/1993 | Akanabe et al. | 359/211 |
| 5,309,274 | 5/1994 | Akanabe | 359/209 |
| 5,383,168 | 1/1995 | O'Brien et al. | 369/44.14 |
| 5,469,734 | * 11/1995 | Schuman | 73/105 |
| 5,521,764 | 5/1996 | Balogh et al. | 359/824 |
| 5,523,811 | 6/1996 | Wada et al. | 354/76 |
| 5,637,861 | 6/1997 | Okada et al. | 250/208.1 |
| 5,650,896 | 7/1997 | Lee et al. | 369/44.14 |
| 5,656,769 | * 8/1997 | Nakano et al. | 73/105 |
| 5,731,909 | 3/1998 | Schachar | 359/676 |
| 5,745,447 | 4/1998 | Kang | 369/44 |

FOREIGN PATENT DOCUMENTS

| | | | |
|---|---|---|---|
| 475 399 | 3/1992 | (EP) | G02B/26/10 |
| 557 998 | 1/1993 | (EP) | G03G/15/04 |
| 632 434 | 1/1995 | (EP) | G11B/7/00 |

* cited by examiner

*Primary Examiner*—Ricky Mack
(74) *Attorney, Agent, or Firm*—Alfred A. Stadnicki; Edward L. Kelley (57) ABSTRACT

A correction element assembly for correcting misalignment of a beam of radiation with respect to a location on a target includes a correction element housing, and first and second piezo elements. The correction element is fixedly mounted in the housing and moveable therewith. The piezo elements are supported by a member having a first portion and a second portion. The first piezo element is mounted to the first portion of the member and to said housing, and moves the housing in a first direction. The second piezo element is mounted to the second portion of the member and to a base, and moves the housing in a second direction substantially perpendicular to the first direction.

13 Claims, 12 Drawing Sheets

BEAM ALIGNMENT CORRECTION ELEMENT ASSEMBLY

RELATED APPLICATIONS

This application is a continuation of application Ser. No. 08/687,928 filed on Jul. 29, 1996 now U.S. Pat. No. 5,909,323. This application is related to pending U.S. application Ser. No. 08/687,931, filed Jul. 29, 1996, entitled "Beam Error Correction Using Movable Correction Element"; and pending U.S. application Ser. No. 08/706,339, filed Aug. 30, 1996, entitled "Multi-beam Scanner with Mechanically Moving Element for Scanning Imaging Surfaces"; and pending U.S. application Ser. No. 08/706,338, filed Aug. 30, 1996, entitled "Multi-beam Scanner with Accousto-Optic Element for Scanning Imaging Surfaces".

TECHNICAL FIELD

The present invention relates to beam scanning systems such as those utilized in electronic prepress operations and more particularly to a correction element assembly suitable for use in such scanning systems to correct beam misalignments in scanning imaging surfaces.

BACKGROUND ART

Modern electronic prepress operations utilize laser scanning systems to write or record images for subsequent reproduction or to scan a prerecorded image at a predefined resolution rate. Such scanning systems may write or record images or scan prerecorded images on various prepress media including, photo or thermal sensitive paper or polymer films, photo or thermal sensitive coatings or erasable imaging materials mounted onto an image recording surface or photo or thermal sensitive paper, polymer film or aluminum base printing plate materials, all used in electronic image reproduction. Such media are mounted onto a recording surface which may be planar but which is more typically curved and scanned with a recording or scanning beam. The primary components of such a system include a recording surface, usually a drum cylinder and a scan mechanism disposed and movable within the drum cylinder. The system also includes a processor, with an associated storage device, for controlling the scanning mechanism and for scanning a prerecorded image, a photodetector and detector processor. The processor and associated storage device may be housed within the system itself or separate from the system with appropriate interconnection to the system.

The processor, in accordance with stored programming instructions, controls the scanning mechanism to write or read images on the plate or other medium mounted to the inner drum cylinder wall by scanning one or more optical beams over the inside circumference of the drum cylinder while the drum cylinder itself remains fixed.

The scanning and hence the recording are performed over only a portion of the cylinder inner circumference, typically between 120° and 320° of the circumference of the drum cylinder. The optical beam(s) are typically emitted so as to be parallel with a central axis of the cylinder and are deflected, by for example, a spinning mirror, Hologon or Penta-prism deflector so as to form a single scan line or multiple scan lines which simultaneously impinge upon the recording surface. The deflector is spun or rotated by a motor about an axis of rotation substantially coincident with the central axis of the drum cylinder. To increase the recording speed, the speed of rotation of the beam deflecting device can be increased. To even further increase the recording speed, multiple beam scanning has been previously proposed.

One such proposed multiple beam scanner has utilized a spinning dove prism with a single light source, as discussed, for example, in U.S. Pat. No. 5,214,528. Using a dove prism beneficially allows the use of a multiple beam source, e.g. a laser diode array, while eliminating the need for multiple beam correction elements and associated hardware. Additionally, for reasons which need not be discussed here, the scan speed of multiple beam systems using a dove prism can exceed that of other types of proposed multi-beam systems.

Figure 10A:
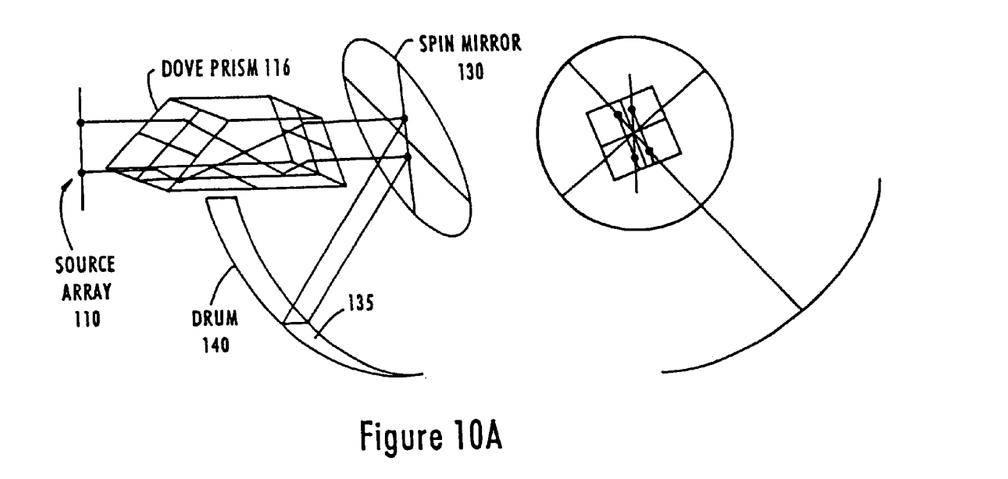
FIG. 10A depicts a conventional multi-beam scanning system.
Figure 10B:
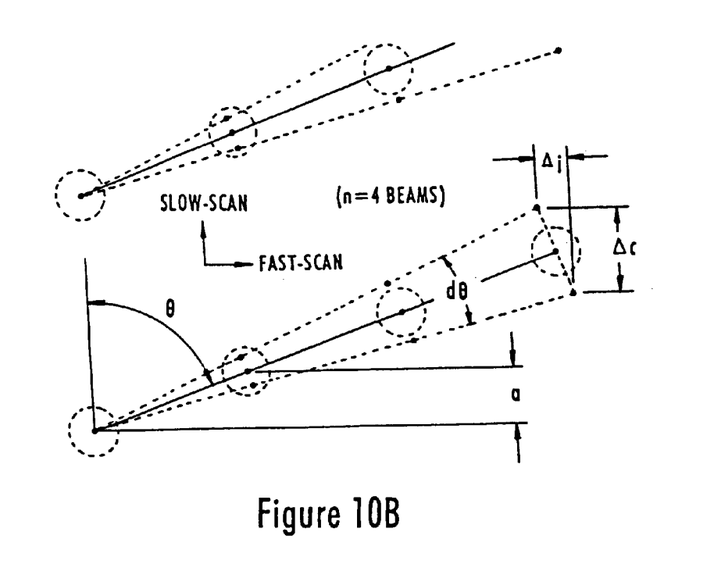
FIG. 10B depicts the rotation of beams in relation to the rotating spin mirror of FIG. 9A.

As shown in FIG. 10A, a dove prism 116 is disposed in the optical path between a laser source array 110 and the spin mirror 130. The prism 116 rotates about an axis coincident with the longitudinal axis of the drum cylinder 140 (or an optical axis which becomes coincident) at half the speed of the spin mirror 130 to scan the image surface 135 of the drum 140. Since the spinning of dove prism 116 produces a 2× axial rotation of all light beams passing through the prism, the multiple beams leaving the prism will rotate in lockstep with the rotation of the spin mirror 130, as shown by the rays marked with filled circles in FIG. 10B. Accordingly, by passing the multiple light beams through a spinning dove prism, crossing of the multiple scan lines formed by the spin mirror is avoided.

Notwithstanding the type of scanning element being utilized, it is of primary importance that the light beam(s) contact the deflector as close as possible to a desired location to ensure that the appropriate scan line(s) are formed on the recording surface and hence the desired image is properly recorded. In the case of a multiple beam system, this includes maintaining the desired spacing or overlapping relationship of the simultaneously scanned beams with respect to each other and the reduction or elimination of any differential scan line bow between successive scan lines.

Further, if a light beam is rotated by a rotating dove prism, the beam's rotation and hence the rotation of the prism must be synchronized with the angular position of the rotating deflector to obtain a proper scan of the recording surface and thereby properly record the desired image. Small changes in the phase locking of the two motors, i.e. the prism and deflector motors, can create banding groups, particularly for commonly used laser array geometries.

A wobble in the spinning dove prism motor or other types of anomalies will cause a misalignment of the dove prism and can create significant banding artifacts which repeat every two scan passes of the deflector. If such a misalignment exists in multiple beam systems of the dove prism type as have been proposed, the system is restricted to recording during only every other rotation of the spin mirror to obtain high quality results. A four beam system is accordingly only two times faster than single beam system, an eight beam system only four times faster, and so on.

The effect of dove prism wobble on system banding can be reduced by a ratio of the beam diameter at the prism to the beam diameter at the spin mirror, e.g. at least a 20×–30× reduction is obtainable for prism beam diameters of ~1 mm or less. Hence, by increasing the ratio, the contribution of prism wobble to system banding can be reduced significantly. Angular alignment sensitivities for scan line bow are improved by the same ratios. A small beam diameter in the prism also reduces the size of the required prism and prism motor.

Hence, banding and twinning caused by misalignment of the dove prism can significantly reduce the advantages which are otherwise obtainable from multi-beam, dove prism type scanning systems.

U.S. Pa. No. 5,097,351 proposes a multi-beam system which utilizes a controlled moveable reflector in lieu of a dove prism and requires each of two laser beams to follow a separate optical path, each having separate focusing and collimating lenses and an acousto-optical modulator (AOM). The controlled reflector is disposed in only one of the optical paths and is driven to rotate one beam in sync with the rotation of the spin deflector. Errors are detected, and corrected by driving the deflector to adjust angular alignment during recording operations. However, the complexity of the system makes implementation difficult, if not impractical.

The above referenced related application describes a multi-beam system which utilizes a spinning dove prism through which all of the writing beams are passed. As described in the application misalignments, caused for example by wobble about the rotation axis of the dove prism, are corrected utilizing a correction lens assembly. The correction lens assembly is controlled to move, e.g. in a cyclic fashion, during recording operations to correct detected misalignment errors.

In order to correct for such misalignments the correction lens assembly must be capable of moving in the manner described in detail in the above referenced related application, which is incorporated herein by reference. Because the lens may need to move dynamically, i.e. continuously, during writing operations, vibrations may be transferred to other system components or structures. Additionally, it may be beneficial to encode the actual movement of the correction lens to correct beam misalignment and/or to monitor movement of the lens during writing operations to ensure correction of the misalignment.

OBJECTIVES OF THE INVENTION

Accordingly the need remains for a correction lens assembly which can be utilized to correct the misalignment in multi-beam scanning systems. Beneficially such an assembly can be driven in a cyclic fashion during writing operations. It would be advantageous if vibrations caused by the movement of the lens within the assembly were isolated from other system components and structures because of the extreme precision required to avoid artifacts in the range of $\mu$ inches and sub-arcsecond angular errors. It would also be beneficial if the movement of the lens to correct beam misalignment could be easily encoded and monitored.

Additional objects, advantages, novel features of the present invention will become apparent to those skilled in the art from this disclosure, including the following detailed description, as well as by practice of the invention. While the invention is described below with reference to preferred embodiments for electronic prepress applications, it should be understood that the invention is not limited thereto. Those of ordinary skill in the art having access to the teachings herein will recognize additional applications, modifications, and embodiments in other fields, which are within the scope of the invention as disclosed and claimed herein and with respect to which the invention could be of significant utility.

SUMMARY OF THE INVENTION

In accordance with a first embodiment of the present invention a correction element assembly for correcting misalignment of a beam(s) of radiation with respect to a location on a target is provided. The assembly includes a housing having a correction element fixedly mounted therein and moveable therewith. The housing is supported from a flexure, which is preferably formed of urethane and encircles the housing.

At least two drive devices are disposed radially around the housing, preferably at 90° separations to generate forces to drive the movement of the housing to correct any misalignment in the radiating beam. More particularly, the drives are operable to apply forces to the housing to deflect the flexure to thereby move the housing such that the correction element moves in a cyclic fashion about its beam axis as it exists with the correction element in a stationary position. To drive this movement of the correction element, each drive axis, i.e. the line along which the force generated by each drive device would be applied as a point load, is made substantially perpendicular to and intersects the longitudinal axis of the housing, which in turn is preferably substantially coincident with the beam axis of the correction element when the correction element is in a stationary position. That is to the extent practicable the longitudinal axis of the housing is made coincident with the optical or beam axis, and the respective drive devices are disposed such that the drive axis will be perpendicular to and intersect the longitudinal axis of the housing.

In accordance with other aspects of the invention the housing may be formed to have extended portions which protrude through the flexure at locations aligned with the drive axis of each of the drive devices. A distal end of each of the extended portions of the housing are located proximate to but separated from an associated drive device.

The drive devices may for example include one or more coils to generate an electro-magnetic force which interacts with the extended portion of the housing or with magnets mounted to the housing. If the electro-magnetic forces are to act on the housing itself, the housing is formed of a ferrite or other material which will react to such forces.

The inventive correction element assembly is particularly suitable for use in beam scanning systems which scan curve surfaces, such as those used in electronic prepress operations. Such systems typically utilize a spinning deflector to deflect the writing or recording beam or beams onto the curved imaging surface. As disclosed in the above referenced related application, multi-beam scanning systems will beneficially also use a spinning element upstream of the spinning deflector to avoid scan line cross over on the curved imaging surface. However, misalignment of the beams with respect to the spinning deflector caused, for example, by wobble about the rotation axis of the spinning upstream element, will degrade the quality of the scan. In such cases, the misaligned beam moves in a pattern determined by the construction and wobble of the upstream spin element. To correct this error, the correction element assembly can be driven to move in synchronization with the misaligned beams, and the spinning upstream element, to correct the misalignment. The correction element may be located either upstream or downstream of the spinning element.

In accordance with a second embodiment of the invention, four drive devices are configured radially, at 90° angles, around the correction element housing. The drive devices can be configured to apply forces simultaneously or sequentially. It may be beneficial, in certain implementations, for the opposed drive devices to operate as a drive pair in reverse polarity such that one of the devices will repel the housing at the same time the opposed device attracts the housing. This provides double the force on the housing as that which may be otherwise obtainable and helps to correct for non-linearities in the drive forces.

According to a still further embodiment of the invention, the movements of the housing can be encoded and monitored using reticules. More particularly, reticules are respectively mounted to the housing and to another portion of the assembly which remains stationary with respect to movement of the housing. A radiation emitter, such as an LED or laser, and a detector, such as a CCD or photodetector, are also mounted on a portion of the assembly which remains stationary with respect to movement of the housing.

The emitter emits a reference beam of radiation on a path which passes through the reticules. The detector is located so as to detect light from the reference beam downstream of the reticules. The detector generates signals corresponding to the received light which represent the movement of the housing.

It may be advantageous in certain implementations to detect misalignment in the writing beams prior to actually performing writing operations. In such cases the correction element assembly can be operated to correct the misalignment during this prewriting period and signals issued from the detector during this period can be used to encode the movement of the housing which is required to correct the misalignment errors. The encoded signals can be stored and then retrieved and utilized during writing operations to control the movement of the housing and thereby correct the misalignment errors during writing operations. Alternatively or additionally, the reference radiation emitter and detector can be utilized during writing operations to monitor the movement of the housing to ensure that the housing is being properly moved to correct the writing beam misalignments which were detected during a prewriting period.

In accordance with a fourth embodiment of the invention, curved piezo elements are utilized to apply the forces required to move the housing in the desired manner. A member with two orthogonal sections, such as an L-shaped member, is utilized in this particular embodiment of the invention. One piezo element is mounted to one section of the member and to the housing such that it will drive the housing in a first direction. Another piezo element is mounted to the other section of the member and to a base such that it will drive the housing in a second direction which is perpendicular to the first drive direction. For example, in the case of an L-shaped member, one piezo element can be attached to an inside surface of the vertical portion of the L and to the housing. This piezo element will drive the housing in the horizontal direction. The other piezo element is attached to the outer surface of the horizontal portion of the L and to a base so as to drive the vertical movement of the housing. By operating the piezo elements simultaneously, omni-directional movement of the housing can be obtained.

In accordance with further embodiments of the invention, the transfer of reaction forces necessarily generated by the drive forces, i.e. forces equal but opposite in direction to the drive forces, and vibrations caused by the movement of the housing can be reduced, if not eliminated, by utilizing compliant members and/or balancing masses. The compliant members may be formed of any type of dampening material or could include a spring arrangement, although the use of a block material having appropriate dampening qualities for the particular implementation is preferred. For example, one or more compliant members can be located between each drive device and the support structure which serves as its base to absorb reaction forces generated in opposition to the drive forces.

The use of four compliant members to support each drive device appears to be particularly advantageous in avoiding twisting and other undesirable effects on the drive device during movement of the housing. However, good results may also be obtainable with less than four supports but may require the use of compliant members which are mechanically or electro-mechanically tuned so as to be stiff when the housing is in a stationary position and more compliant or soft during the movement of the housing.

Compliant members may also beneficially be located between each drive device and the housing. These compliant members can serve as a flexible support for the housing while also absorbing and hence isolating vibration forces caused by the movement of the housing which might otherwise be transferred into other parts of the assembly or other system components or structure.

Rather than locating compliant members between the housing and the drive devices, it may be preferable to mount the housing independently of the drive devices and directly to the assembly structure which acts as a base. In this case, compliant members can be located between the housing and the assembly structure to support the housing while serving as a flexure and vibration isolator.

It may be particularly advantageous in certain implementations to maintain the drive devices stationary with respect to the housing movement. This can be accomplished by fixedly supporting the drive devices from the assembly structure. In accordance with one embodiment of the invention, opposed coils are included in each drive device. That is the respective drive device coils operate to simultaneously apply a drive force in the direction of the housing and a balancing force in the opposite direction. The drive force drives the movement of the correction element housing while the balancing force is balanced by a balancing mass which is supported from the assembly structure with compliant members. Accordingly, the balancing mass will balance at least a portion of the balancing force while the compliant members will absorb any remaining portion of the balancing force. The balancing mass is preferably supported by two or four compliant members.

In such an arrangement the housing is preferably also independently supported by compliant members from the assembly structure. Although the housing and balancing mass could be formed of a ferrite or other material which reacts to electro-magnetic forces, preferably magnets are mounted on the housing and balancing mass in alignment with the respective drive devices to interact with the forces generated by the respective coils. Coil-coil drive geometries are also, of course, possible.

DESCRIPTION OF THE PREFERRED EMBODIMENTS

FIGS. 1–8 depict various correction lens assemblies in accordance with the present invention.

Figures 1A, 1B, 1C:
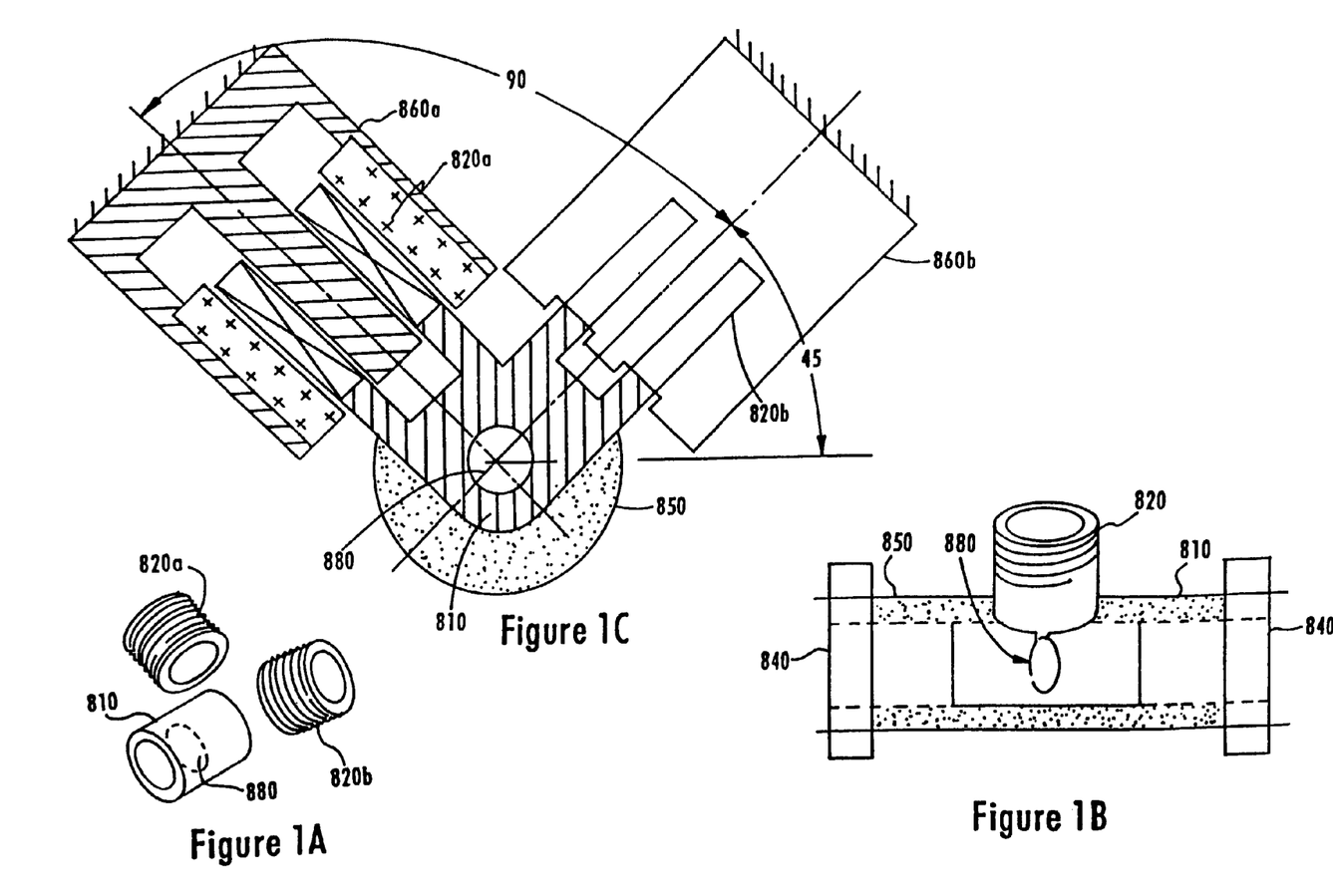
FIG. 1A is a perspective view of a lens housing and coil arrangement in accordance with a first embodiment of the present invention.
FIG. 1B depicts a longitudinal cross-section of the lens housing of FIG. 1A.
FIG. 1C depicts a cross-section looking through the lens housing of FIG. 1A.

Turning first to FIG. 1A, a perspective view of a two coil lens correction assembly is depicted. The lens 880 is housed in housing 810 which has a longitudinal axis which is substantially coincident with the longitudinal axis of the cylindrical drum. Coils 820a and 820b are positioned at a 90° angle from each other.

FIG. 1B is a longitudinal cross-section taken through the center of the housing 810. As shown in FIG. 1B, the housing 810 is suspended from stationary supports or base 840 by a flexure 850 which encircles the housing 810. The flexure may beneficially be formed of urethane. If desired, the shape and material of the flexure 850 could be modified so long as the modified flexure is capable of suspending the lens housing 810 in a manner which allows the housing to move radially about the optical axis of the correction lens as it exists in a stationary position, with a minimal amount of force being applied.

Referring now to FIG. 1C, each the coils 820a and 820b is supported in a stationary housing 860a and 860b. As shown, the housing 810 extends or protrudes beyond the flexure 850 at each coil location. The housing 810 can be formed of any material which will react to the electromagnetic forces generated by the respective coils 820a and 820b.

The frequency, amplitude and shape of the pattern that the movement of lens 880 will inscribe is controlled by the wave form of the signals issued from the lens correction assembly controller (not shown) as input signals to the respective coils. Accordingly, the lens can be driven to move such that the lens is correctly positioned to deflect the beams passing therethrough to thereby offset any misalignment in the beams. The movement of the lens 880 is such that its optical axis traces a pattern corresponding to the misalignment pattern of an upstream rotating element, such as a dove prism, but 180° out of phase therewith, with a sufficient amplitude to deflect the beams into correct alignment with the axis of rotation of for example a rotating spin mirror deflector.

In the depicted lens correction assembly, the housing has a weight of less than 0.5 ounces, the lens weight is less than 0.15 ounces and the weight of both coils, including the coil housings, is less than 0.75 ounces. Accordingly, the entire assembly is very light weight.

Figure 2:
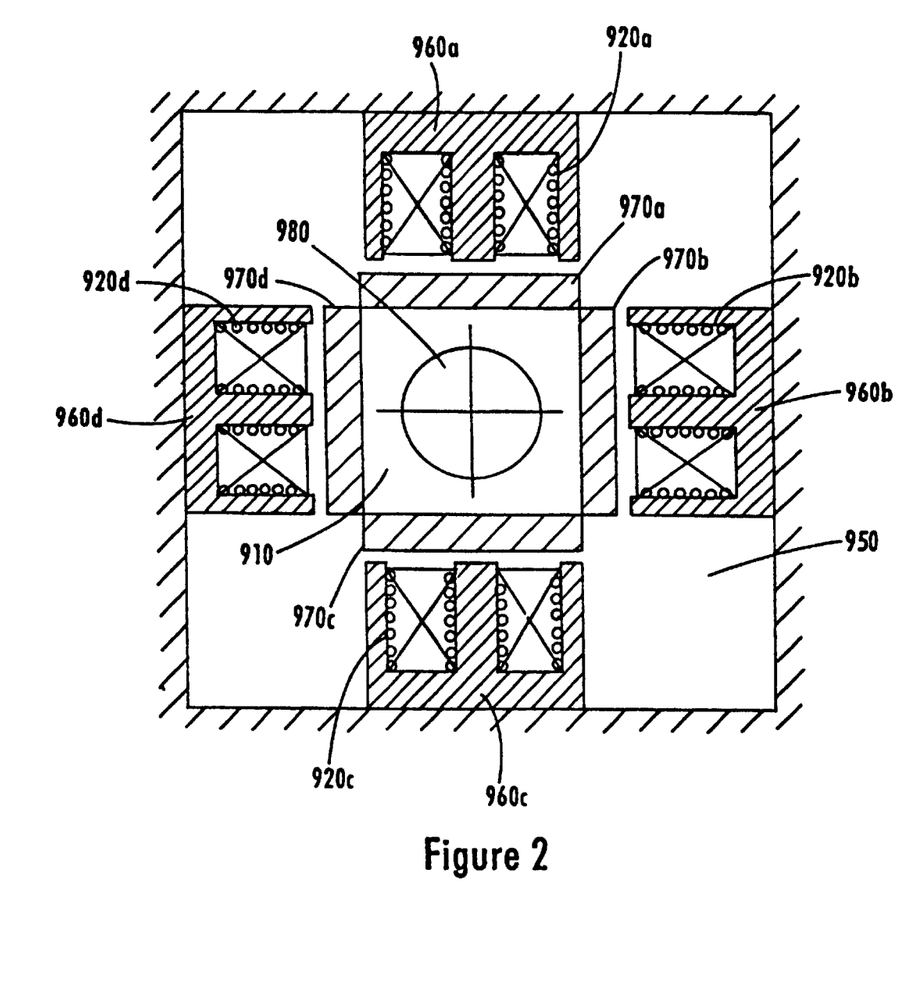
FIG. 2 depicts a second embodiment of the lens correction assembly in accordance with the present invention.

FIG. 2 depicts another lens correction assembly arrangement. As shown, four magnetic disks or squares 970a–d are mounted to the housing 910 of the lens 980. The four disks or squares 970a–d are spaced at 90° angles around the periphery of the housing 910. Although the housing 910 is depicted as having four flat outer surfaces, it will be understood that, if desired, the housing outer surface could be of virtually any shape. The housing 910 is suspended by a urethane or other flexure 950 in a manner similar to that described above in connection with FIGS. 1A–C. Each of the coils 920a–d are housed in a cylindrical ferrite housing 960a–d, respectively, and disposed opposite one of the ferrite disk or squares 970a–d. The coil housings 960a–d are mounted so as to be stationary with respect to the movement of the lens housing 910.

The opposed coils 920a–920c and 920b–920d form two coil pairs which are respectively operated so that when one coil of the coil pair is driven to produce a force which attracts its adjacent ferrite disk or square, the other coil of the pair is driven to generate an electro-magnetic force which repels its adjacent ferrite disk or square and vice-versa. Accordingly, the lens correction assembly controller will simultaneously issue signals to the four coils 920a–d to move the optical axis of the lens to correct the misalignment in the beams. Alteratively, if desired, the respectively paired coils could be driven sequentially rather than simultaneously to drive the required movement of the lens 980.

Figure 3A:
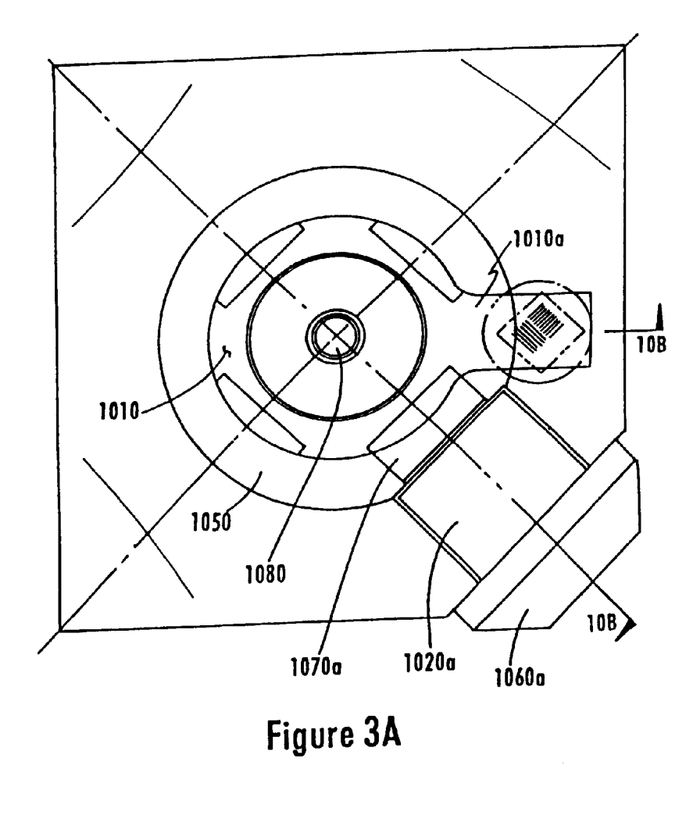
FIG. 3A depicts a lens correction assembly with a reticule mounted thereto in accordance with a third embodiment of the invention.

FIG. 3A depicts a still further lens correction assembly. As shown, FIG. 3A provides a four coil arrangement with the coils 1020a–d disposed 90° from each adjacent coil around the lens 1080. The lens 1080 is supported within a housing 1010. The housing includes an extension 1010A which supports a reticule which is utilized to encode the proper motion of the correction lens 1080 to correct for detected misalignment. The housing 1010 further supports magnets 1070a–d which are disposed adjacent to the coils 1020a–d. The gap between each coil and the adjacent magnet is such that the magnet and coil will not come into contact during the movement of the lens. Opposed coils are wired as a coil pair and controlled so as to operate in reverse polarity to double the force available to move the lens housing 1010 in the same manner as described in FIG. 2.

Figure 3B:
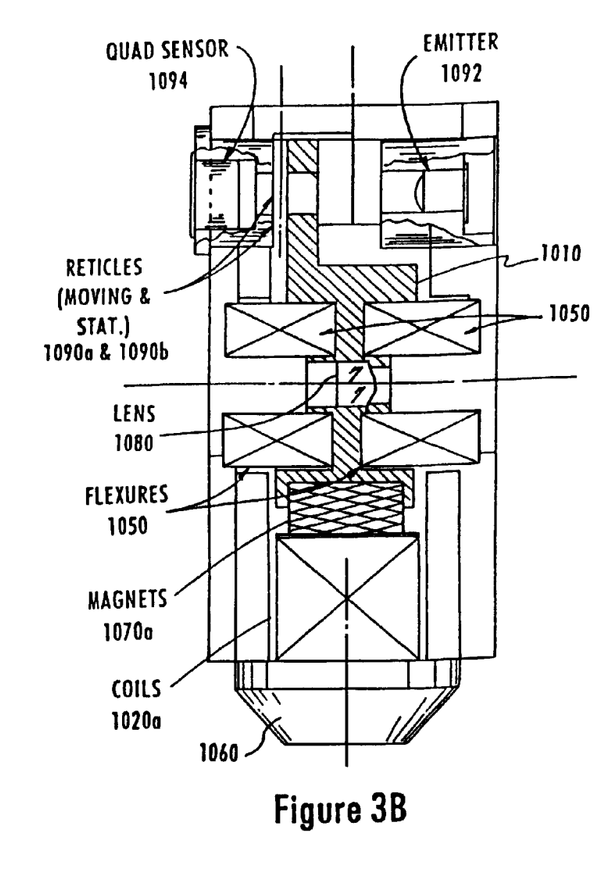
FIG. 3B depicts a cross-section of the correction lens assembly depicted in FIG. 3A.
Figure 3C:
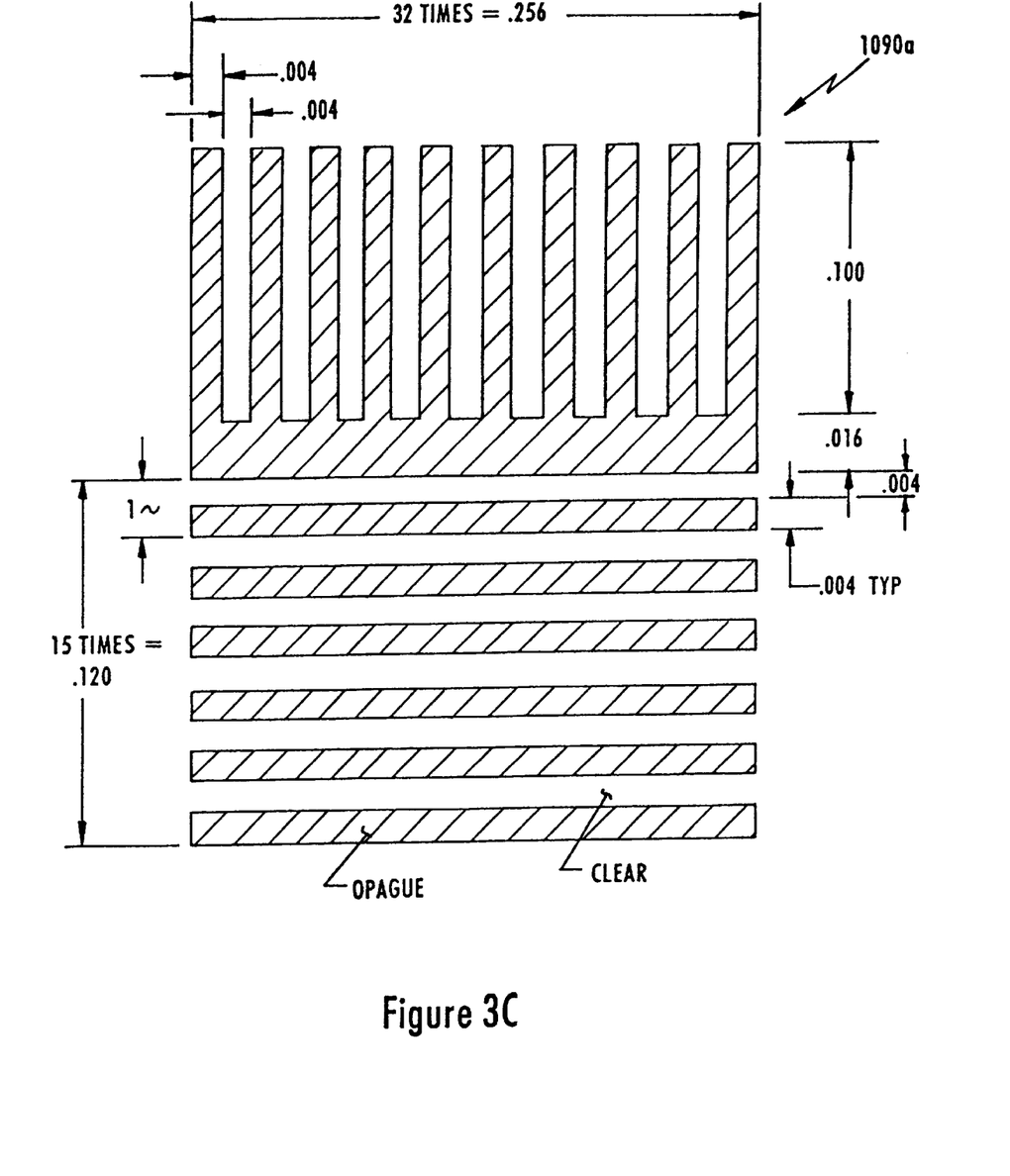
FIG. 3C details one of the reticules shown in the FIG. 3A.
Figure 3D:
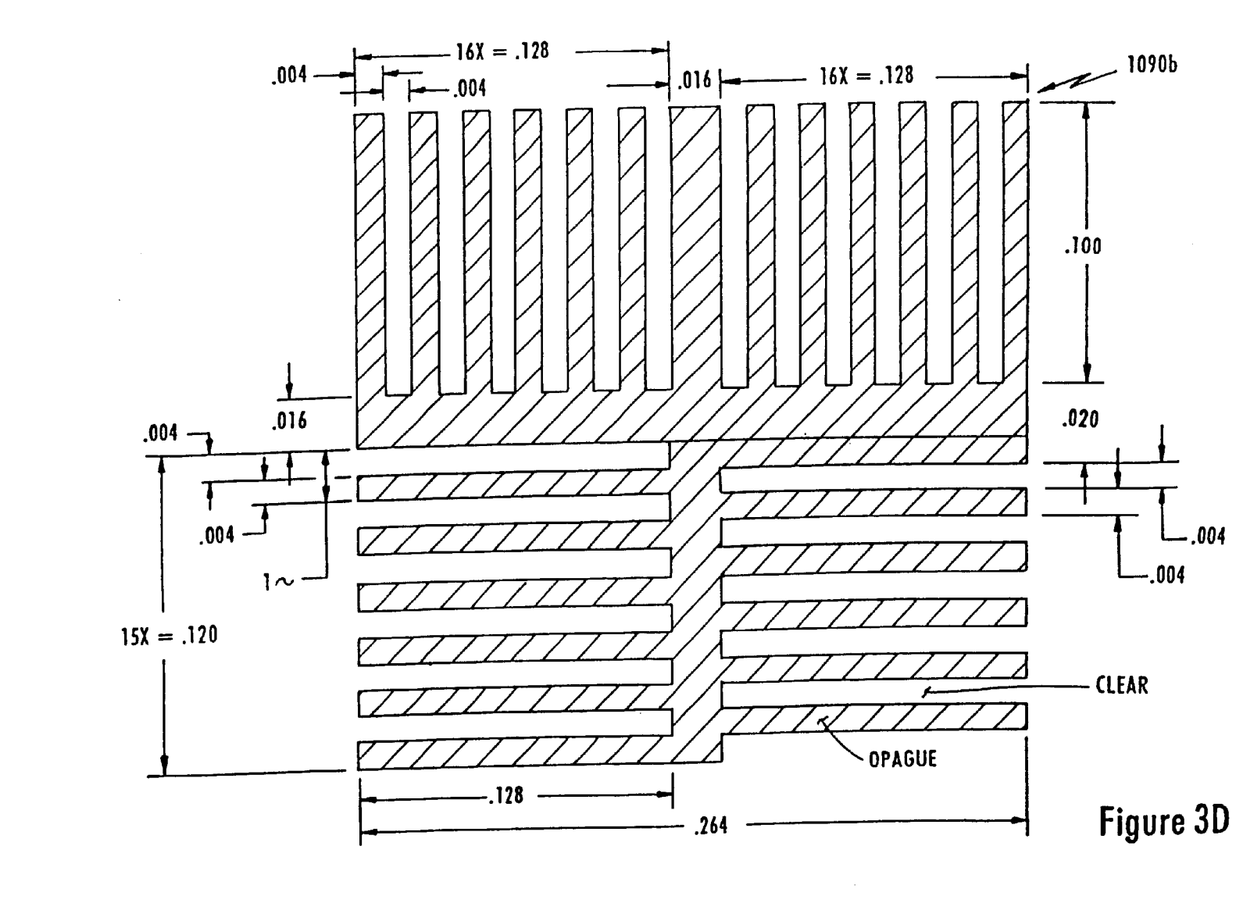
FIG. 3D depicts the other reticule shown in the FIG. 3A.

As shown in FIG. 3B, the pair of reticules 1090a and 1090b are mounted to move relative to each other. Reticule 1090a is mounted to the stationary housing. The other reticule 1090b is mounted to move with the lens housing 1010 and hence the lens 1080. A light emitter 1092 and quad detector 1094 are also included in the assembly and mounted to the stationary housing. The reticules 1090a and 1090b are respectively detailed in FIGS. 3C and 3D, with opaque areas indicated by diagonal lines.

The reticules 1090a and 1090b and quad detector 1094 are aligned to the axes of the coil pairs. The detector produces two signals capable of defining the motion of the lens housing 1010 as is well understood in the art. The signals can be processed to encode the movement of the housing 1010 required to correct any beam misalignment as discussed above. During writing operations, the quad detector 1094 may also be utilized to track the movement of the lens housing 1010 to verify proper alignment of the writing beam.

Figure 4:
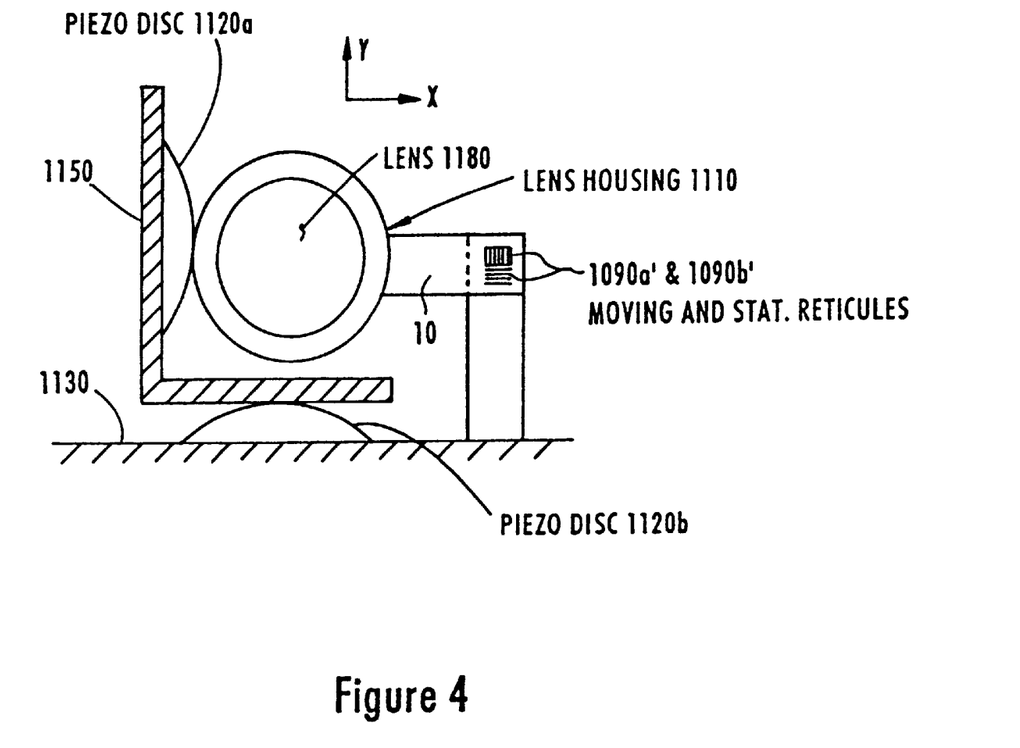
FIG. 4 depicts a correction lens assembly which includes piezo elements in accordance with a fourth embodiment of the invention.

FIG. 4 depicts still another assembly arrangement for moving the lens housing. The FIG. 4 configuration does not require any flexures to support and suspend the lens housing 1110. As depicted, the lens 1180 is supported in the housing 1110. The housing 1110 is supported from L-shaped member 1150 by way of the piezo-electric element 1120a which is fixedly attached at its ends to the support member 1150. A second piezo-electric element 1120b is fixedly attached at its ends to a stationary base surface 1130. Accordingly, the piezo-electric elements can be driven by the lens correction assembly controller (not shown) in the manner described above to move the lens housing 1110 such that the lens 1180 is translated to correct detected misalignment of the beams.

As depicted in FIG. 4 the lens housing 1110 is affixed to a part of the piezo-electric element 1120a which is positioned to drive the movement of the housing 1110 and lens 1180 in the horizontal or X direction. The support member 1150 is attached to a portion of piezo-electric element 1120b. Accordingly, the piezo-electric element 1120b can be driven to move the support member 1150 along with the lens housing 1110 and lens 1180 in a vertical or Y direction. Connected to the lens housing 1110 is a moving reticle 1090a' and connected to the stationary base surface 1130 is a stationary reticle 1090b'. The reticles 1090a' and 1090b' are substantially similar to reticles 1090a and 1090b described above with reference to FIGS. 3A–3D and accordingly will not be further described to avoid unnecessary duplication.

In the lens correction assemblies described above, the movement of the correction lens could induce vibrations in various other scanning system components and/or the system structure. Although vibrations which are coherent in frequency and phase lock with the beam scanning frequency may not cause problematic vibrations in such components and structure, vibrations at half the scanning frequency could produce twinning artifacts in, for example, an imaging medium mounted to the cylindrical drum on which the writing is to occur. These vibrations could also excite non-coherent natural frequencies in the supporting structure thereby producing banding artifacts. Accordingly, it may be beneficial to utilize counterbalancing reaction masses and/or dampeners rather than the structure which supports other components of the scanning system to balance the forces required to move the lens. In this way, the center of mass of the lens correction assembly will remain unchanged during the movement of the lens and no static or dynamic forces which could deflect or vibrate the system structure and/or other system components will occur.

FIGS. 5A–B through 9A–B depict various lens correction assemblies which reduce vibration in the system support structure by directing the forces required to move the lens to correct beam misalignment into reaction masses or dampening elements instead of against the supporting structure. Hence, the reaction masses and dampeners act as force and vibration reducers. By carefully selecting the geometry and materials utilized, the vector sum of the forces on the system structure can be reduced to very close to, if not to, zero.

Figure 5A:
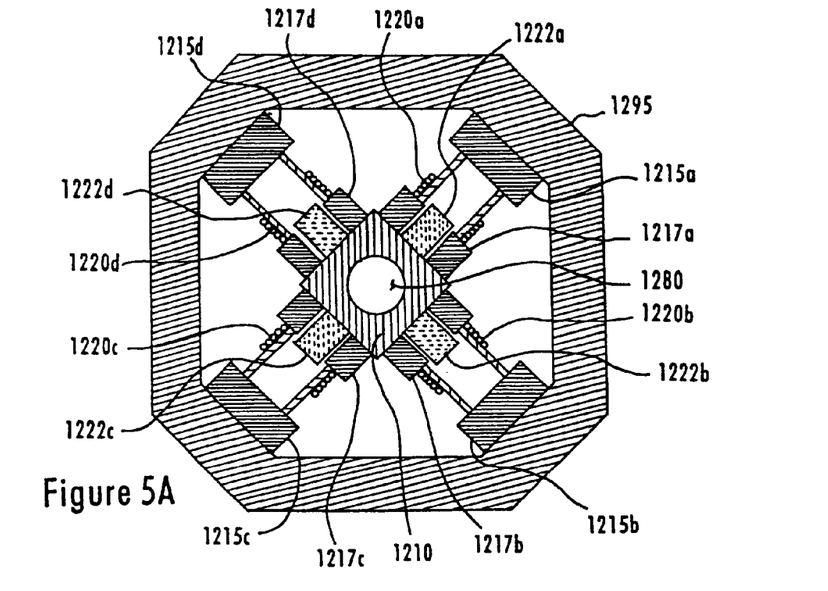
FIG. 5A depicts a lens correction assembly which includes vibration and force dampening in accordance with a fifth embodiment of the invention.
Figure 5B:
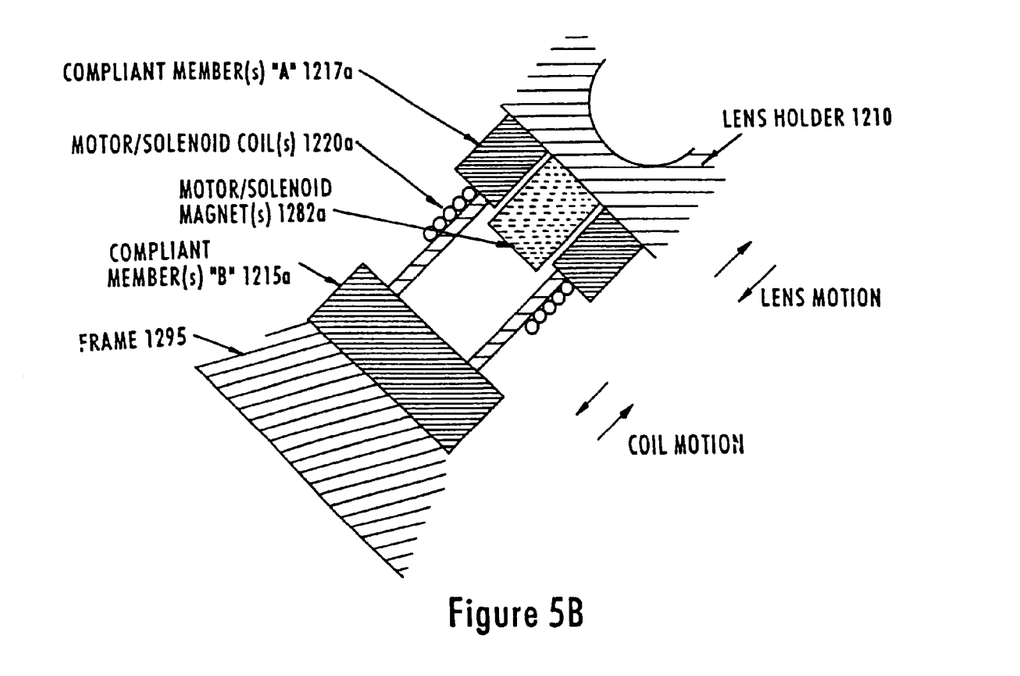
FIG. 5B details the force and vibration dampening components of the embodiment to FIG. 5A.

Referring first to FIGS. 5A and 5B a lens 1280 is housed within a housing 1210. Four coils 1220a–d, each separated from adjacent coils by 90°, are disposed around the lens housing 1210. The coils 1220a–d are motor/solenoid coils. Four motor/solenoid magnets 1222a–d are fixedly mounted to the housing 1210 such that each magnet is proximate to one of the motor/solenoid coils 1220a–d. Each of the coils 1220a–d is supported from the system support structure 1295 by compliant members 1215a–d and 1217a–d. The compliant members 1215a–d and 1217a–d absorb the forces caused by the lens motion. Accordingly, equivalent forces are not produced on the supporting structure 1295, and vibrations in the supporting structure are reduced, if not eliminated. Compliant members 1215a–d and 1217a–d act as soft springs. Although the assembly shown in FIGS. 5A–B is a relatively uncomplicated structure, static centering of the lens 1280 may be difficult to maintain unless the compliant members can be selectively made softer or stiffer depending upon whether or not movement of the lens 1280 is being driven. That is, the compliant members 1215a–d and 1217a–d are beneficially stiff during periods when it is desirable for the lens to be statically centered, i.e. when the housing and lens are stationary, and soft only during those periods in which the lens is being driven to move. This may require that the compliant members be mechanically or electro-mechanically tuned.

Figure 6A:
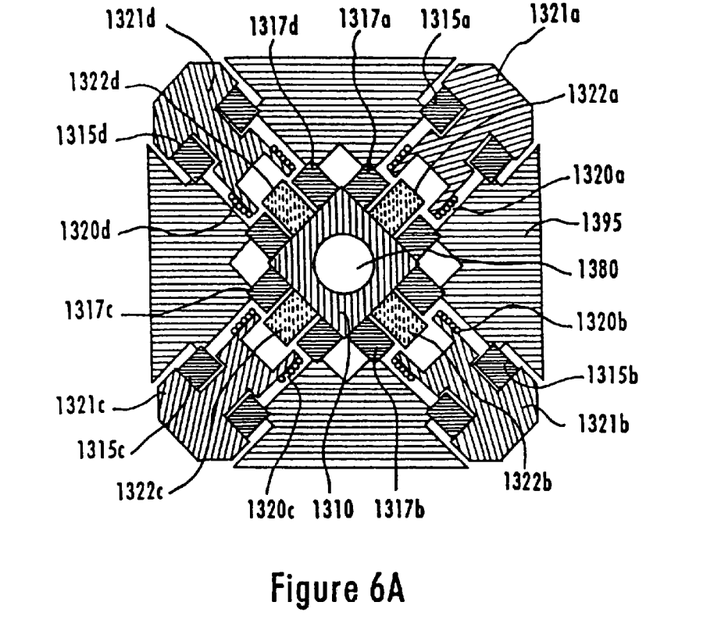
FIG. 6A depicts another embodiment of the invention which includes force and vibration dampening.
Figure 6B:
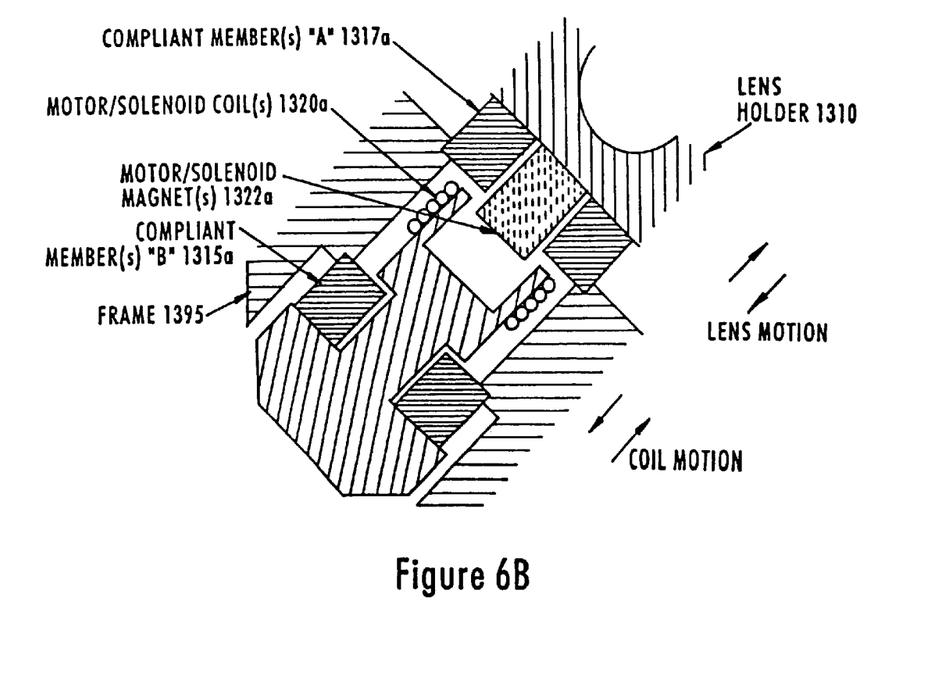
FIG. 6B details the dampeners of the FIG. 6A embodiment.

FIGS. 6A–B provide a configuration of the lens correction assembly which avoids the potential problems in static centering of the configuration depicted in FIGS. 5A–B. As shown in FIG. 6A a lens 1380 is supported in housing 1310. Four coils 1320a–d are disposed around the circumference of the lens housing 1310 with each coil being 90° from adjacent coils. Four magnets 1322a–d are respectively disposed proximate to one of the coils 1320a–d and mounted to the housing 1310. Compliant members 1315a–d and 1317a–d are mounted to the assembly support structure 1395.

The coil support members 1321a–d are separated by a space from the support structure 1395 and all elements supported therefrom. Accordingly, the lens moving mechanism is connected to the supporting structure 1395 by compliant members 1315a–d and 1317a–d. These compliant members induce some force in the supporting structure 1395 but by proper selection of the spring constant and/or the mass of the assembly components, the vector sum of the forces exerted on the supporting structure 1395 can be substantially reduced or eliminated.

For example, a zero sum force can, in theory, be obtained for all frequencies of lens motion if the frequency of mechanical resonance of the mass and dampener system is equal to the frequency of mechanical resonance of each reaction element, e.g. the coil support subassembly. More particularly, if the ratios of the spring constant to mass are equal, the force on the supporting structure will, in theory, be reduced to zero. This is true whether the coil pairs push and pull the lens simultaneously or only one of each pair of coils is driven at a given time to either push or pull on the lens housing 1310. If the frequencies of the lens motion approaches the mechanical resonance frequency, the mechanical damping "Q factor" of the assembly should also be matched to maximize vibration reduction as will be well understood by the skilled artisan. At high frequencies the frictional couplings, e.g. due to air flow friction, and airborne acoustic coupling between the moving components and the supporting structure 1395 are beneficially also considered to further enhance vibration isolation.

Figure 7A:
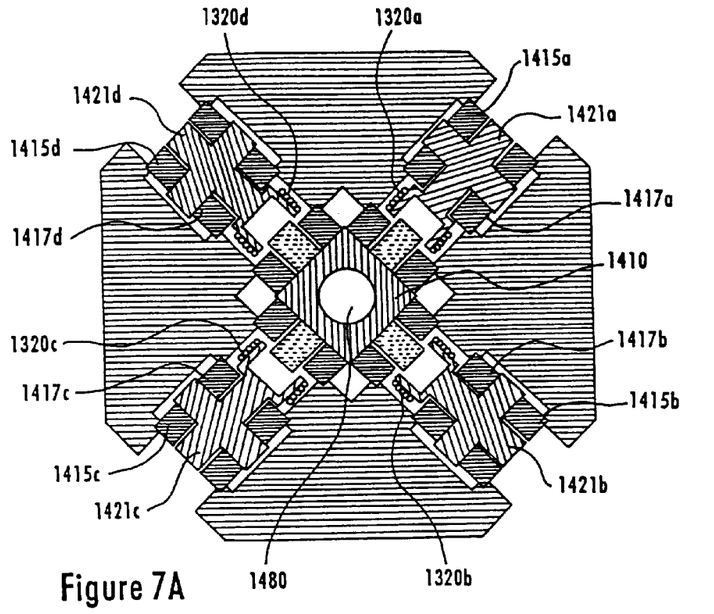
FIG. 7A depicts another embodiment of the invention which includes force and vibration dampeners.
Figure 7B:
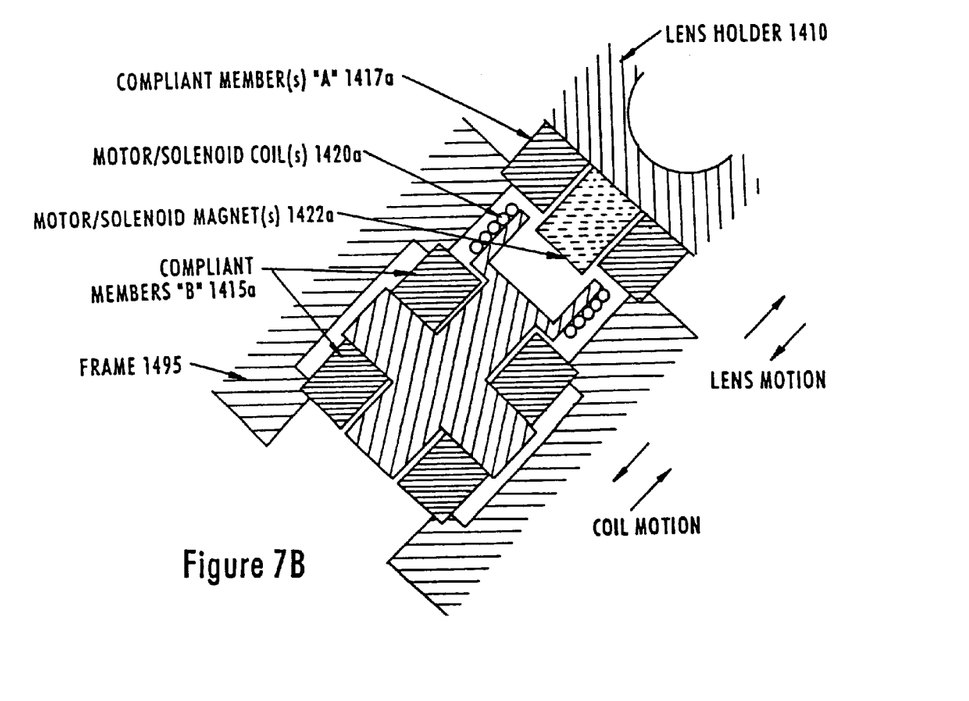
FIG. 7B details the dampening members shown in the FIG. 7A embodiment.

Turning now to FIGS. 7A and B, a configuration similar to that shown in FIGS. 6A–B is depicted. As can be seen from the drawings, the primary difference between FIGS.

7A–B and 6A–B is in the shape of the coil supports 1421a–d which are supported by compliant members 1415a–d and 1417a–d. The assembly depicted in FIGS. 7A–B operates in a manner similar to that described above with respect to FIGS. 6A–B. However, because compliant members 1415a–d and 1417a–d provide multiple supports for each of the coil support members 1421a–d, better stiffness is provided against twisting forces on the coils 1320a–d and balancing masses, including support member 1421a–d, thereby reducing coil to magnet centering errors. The use of equal masses and equal spring constants for many of the parts may also simplify the damping and coupling match in the configuration depicted in FIGS. 7A–B as compared with that depicted in 6A–B.

Figure 8A:
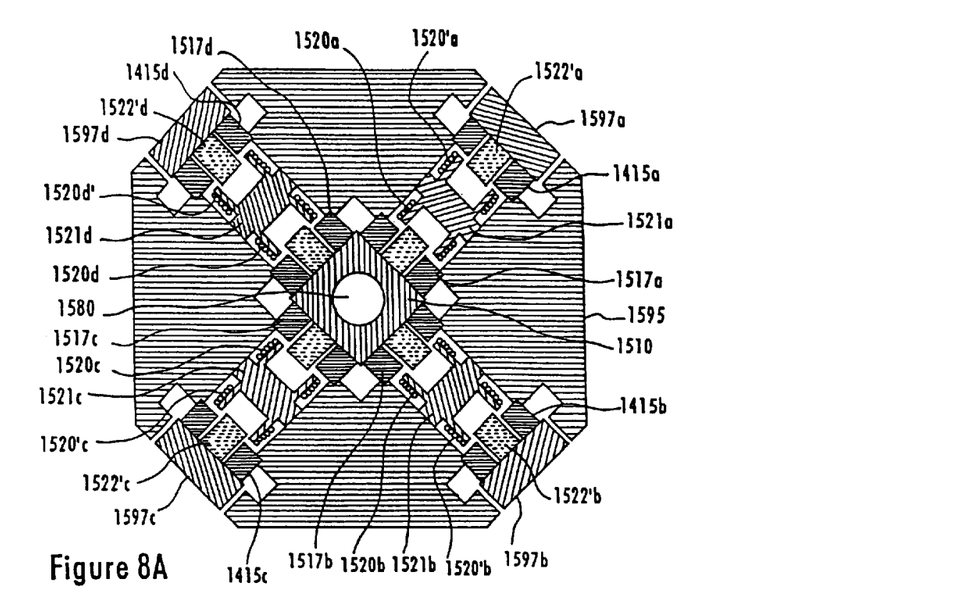
FIG. 8A depicts a correction lens assembly which includes force and vibration dampeners and a balancing mass in accordance with still another embodiment of the invention.
Figure 8B:
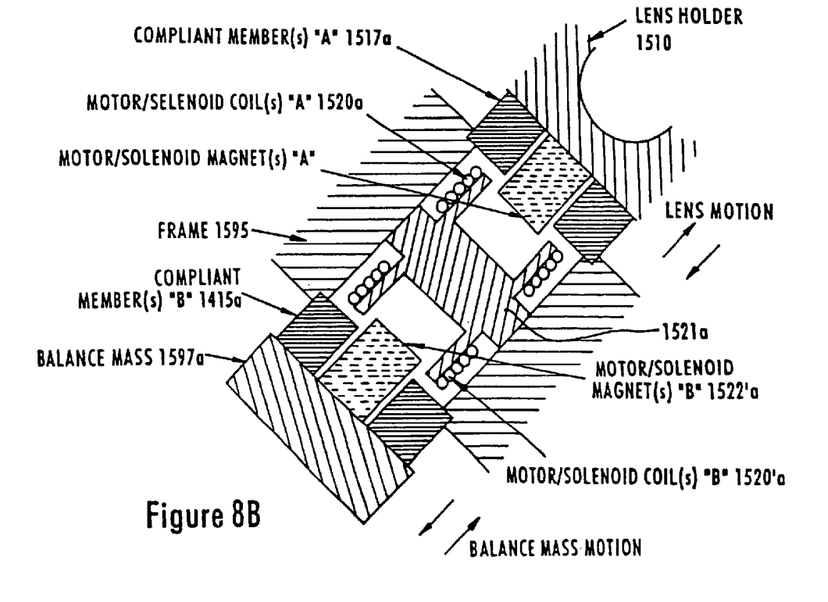
FIG. 8B details the dampening members and balancing mass of the FIG. 8A embodiment.

FIGS. 8A–B depict a still further configuration of the lens correction assembly. This configuration is somewhat more complicated than that depicted in FIGS. 5–7 but facilitates the use of multiple motor/solenoid coils and magnets for electronic control of the matching or balancing forces. Accordingly, the configuration of FIGS. 8A–B provides enhanced vibration isolation as compared with the previously described configurations. It will be understood that by adding a vibration sensor and feedback system elimination of virtually any vibrations could be assured.

As depicted in FIGS. 8A and B the coil supports 1521a–d are fixedly mounted to the supporting structure 1595. Balancing masses 1597a–d are supported from the supporting structure 1595 by compliant members 1415a–d. As shown, each of the coil support structures 1521a–d support multiple coils 1520a–d and 1520'a–d. Additionally, the balancing masses further support motor/solenoid magnets 1522'a–d which interact with respective coils 1520'a–d. The coils 1520'a–d can be driven in relation to the driving forces applied by coils 1520a–d on the lens housing 1510 to thereby insure equal but opposite offsetting forces are applied to the balancing masses 1597a–d, thus eliminating the possibility of vibrations in the supporting structures.

Figure 9A:
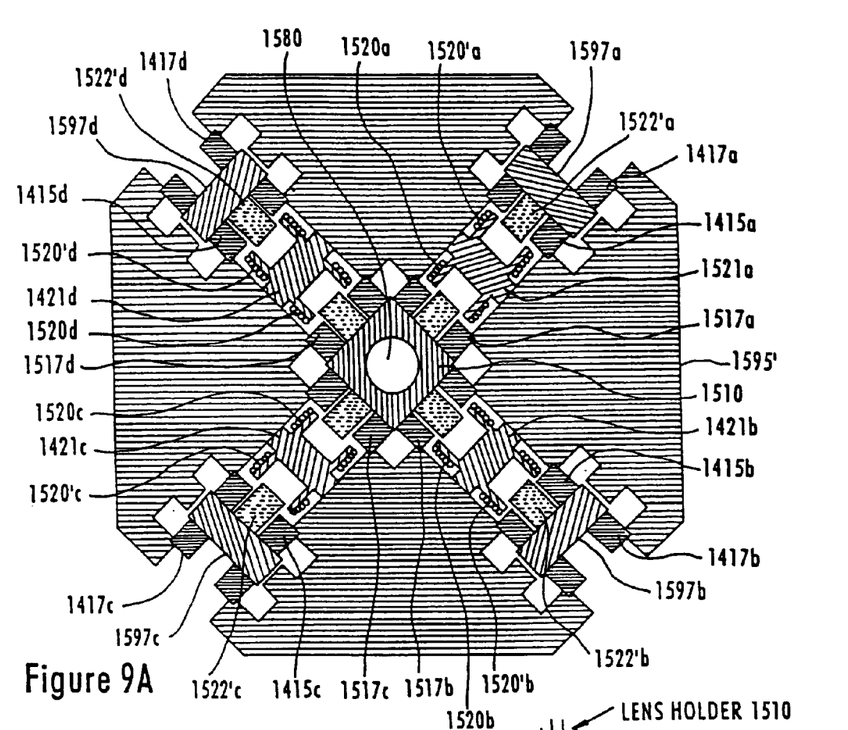
FIG. 9A depicts a correction lens assembly similar to that depicted in FIG. 8A but with the balancing mass supported by four vibration dampeners in accordance with a further embodiment of the invention.
Figure 9B:
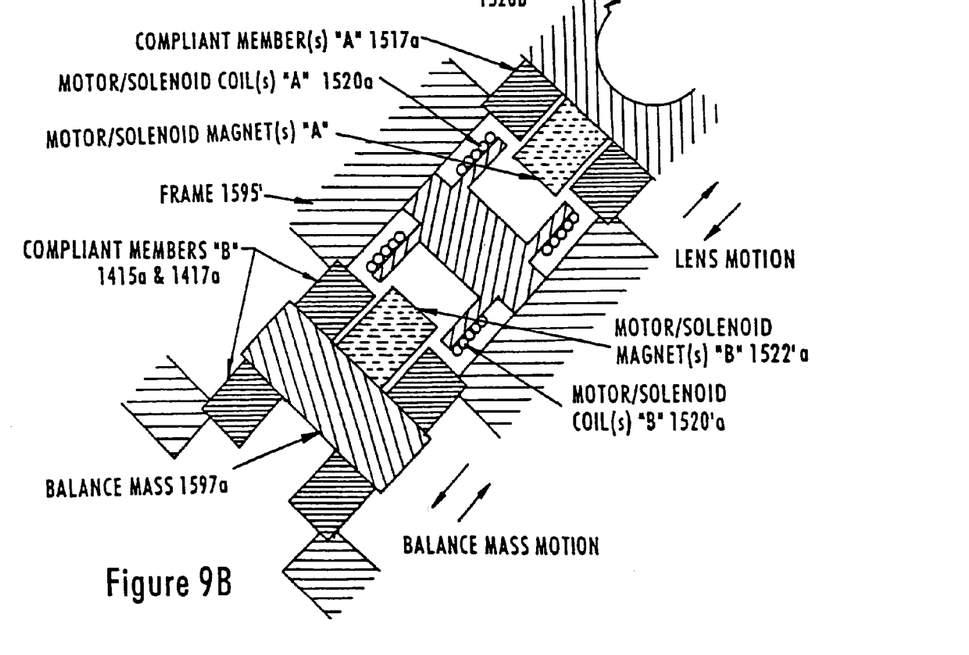
FIG. 9B details the dampening members and balancing mass of the FIG. 9A embodiment.

FIGS. 9A–B depict yet another configuration of the lens correction assembly. This configuration is similar to that depicted in FIGS. 8A–B and similar elements are referenced with similar reference numerals. As shown in FIGS. 9A–B, each of the balancing masses is supported from the supporting structure 1595' by four compliant members 1415a–d and 1417a–d which provide multiple supports for each of the balancing masses. As has been previously described with reference to FIGS. 7A and B, this support arrangement provides better stiffness against twisting forces on the balancing masses, thereby reducing coil to balancing mass centering errors.

It will also be recognized by those skilled in the art that, while the invention has been described above in terms of preferred embodiments it is not limited thereto. Various features and aspects of the above described invention may be used individually or jointly. Further, although the invention has been described in the context of its implementation in a particular environment and for particular applications, e.g. electronic prepress applications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

We claim:

1. A correction element assembly for correcting misalignment of a beam of radiation with respect to a location on a target, comprising:
   a housing having a correction element fixedly mounted therein and moveable therewith;
   a member having a first portion and a second portion;
   a first piezo element mounted to the first portion of the member and to said housing and configured to move said housing in a first direction; and
   a second piezo element mounted to the second portion of the member and to a base, and configured to move said housing in a second direction substantially perpendicular to said first direction;
   wherein said correction element has a beam axis and said movement of said housing causes said correction element to move substantially orthogonal to said beam axis.

2. A correction element assembly according to claim 1, wherein said movement of said housing causes said correction element to move in a cyclic fashion substantially about the beam axis.

3. A correction element assembly according to claim 1, wherein:
   each of the first and the second portions of the member have first and second opposite side surfaces, with the first side surface facing said housing;
   the first piezo element is mounted to the first side surface of the first portion of the member; and
   the second piezo element is mounted to the second side surface of the second portion of the member.

4. A correction element assembly according to claim 1, further comprising a reticule mounted to and moveable with said housing for encoding movement of said housing.

5. A correction element assembly according to claim 1, further comprising a reticule mounted to and moveable with said housing for monitoring movement of said housing.

6. A correction element assembly according to claim 1, further comprising:
   a first reticule mounted to and moveable with said housing;
   a second reticule mounted so as to be stationary with respect to said first reticule;
   a reference radiation emitter, mounted so as to be stationary with respect to said first reticule, for emitting a reference beam of radiation on a path passing through said reticules;
   a detector, mounted so as to be stationary with respect to said first reticule, for detecting radiation from the reference beam downstream of said reticules and generating signals representing movement of said housing.

7. A correction element assembly according to claim 1, wherein the correction element is configured such that the beam of radiation will pass through the correction element on a path substantially parallel to the beam axis.

8. A correction element assembly for correcting alignment of a beam of radiation, comprising:
   a correction element;
   a first piezo element connected to the correction element at a first point; and
   a second piezo element connected to the correction element at a second point;
   wherein the first and the second piezo elements are configured to move the correction element in substantially orthogonal directions; and
   wherein the correction element has a beam axis, and the first and the second piezo elements are configured to cause the correction element to move substantially orthogonal to the beam axis.

9. A correction element assembly according to claim 8, wherein:

the first and the second piezo elements are configured to move the correction element in a cyclic fashion substantially about the beam axis.

10. A correction element assembly according to claim 8, wherein:

the first piezo element is mounted to a first surface of a member, and the first surface faces the correction element; and the second piezo element is mounted to the second surface of the member, and the second surface faces away from the correction element.

11. A correction element assembly according to claim 8, further comprising:

a first reticule moveable with the correction element;

a second reticule which remains stationary with respect to said first reticule;

a reference radiation beam emitter disposed so as to direct a reference beam of radiation on a path passing through the first and the second reticules; and a detector disposed so as to detect radiation from the reference beam downstream of the first and the second reticules.

12. A correction element assembly according to claim 8, wherein the second point is angularly disposed from the first point by an angle other than 0° and 180°.

13. A correction element assembly according to claim 8, wherein the correction element is configured such that the beam of radiation will pass through the correction element on a path substantially parallel to the beam axis.

* * * * *